United States Patent [19]

Ericsson

[11] Patent Number: 4,574,481

[45] Date of Patent: Mar. 11, 1986

[54] MOTOR ASSEMBLY FOR CARRYING ON THE BACK

[76] Inventor: C. G. Folke Ericsson, Sibyllegatan 4E, S+752 31 Uppsala, Sweden

[21] Appl. No.: 567,855

[22] PCT Filed: Mar. 30, 1983

[86] PCT No.: PCT/SE83/00123

§ 371 Date: Dec. 2, 1983

§ 102(e) Date: Dec. 2, 1983

[87] PCT Pub. No.: WO83/03334

PCT Pub. Date: Oct. 13, 1983

[30] Foreign Application Priority Data

Apr. 2, 1982 [SE] Sweden ................................ 8202135

[51] Int. Cl.⁴ ...................... B27B 17/00; A01M 21/00

[52] U.S. Cl. ............................... 30/296 R; 30/166 R; 244/4 A

[58] Field of Search ................. 244/4 A, 23 A; 173/2, 173/30; 30/296 R, 166 R

[56] References Cited

U.S. PATENT DOCUMENTS

| | | | |
|---|---|---|---|
| 2,461,347 | 2/1949 | Pentecost | 244/4 |
| 2,909,068 | 10/1959 | Haug | 30/296 R |
| 3,023,980 | 3/1962 | Martin et al. | 244/4 |
| 3,040,471 | 6/1962 | Blase | 43/148 |
| 3,219,129 | 11/1965 | Yamada | 30/296 R |

FOREIGN PATENT DOCUMENTS 600401 4/1948 United Kingdom .

*Primary Examiner*—Jimmy C. Peters

*Attorney, Agent, or Firm*—Bacon & Thomas

[57] ABSTRACT

The invention relates to a motor assembly for carrying on the back suspended in a harness (2) and comprising at least one driving motor (8) for driving a connected tool, such as a saw bar. The motor assembly is characterized by comprising means, such as one or more propellers or impellers, which provide an upwardly directed lifting force, which at least partially counterbalances the weight of the motor assembly and thereby reduces the load on the operator.

13 Claims, 9 Drawing Figures

MOTOR ASSEMBLY FOR CARRYING ON THE BACK

Figure 1:
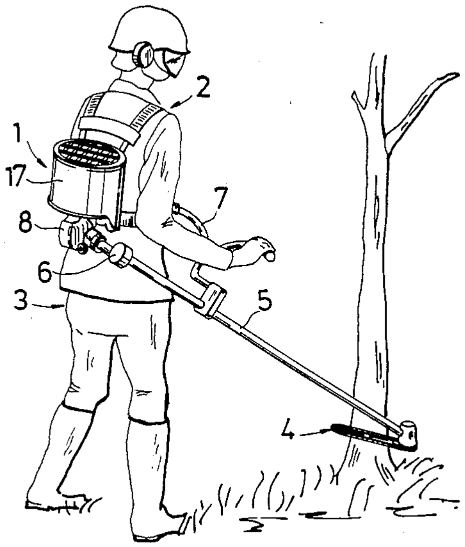

The present invention relates to a motor assembly portable on the back which puts a substantially reduced load on the operator compared to conventional assemblies carried on the back. The novel motor assembly of the invention may advantageously be used for driving shearing and cutting tools in, for example, forestry and gardening, but may also be used for other purposes for which backcarried motor assemblies are or may be used.

In forestry motor assemblies carried on the back are used inter alia in sawing equipment for clearance work. A conventional clearing saw consists of an elongate supporting member, usually a power transmission tube, which at one end thereof supports an internal combustion engine and a saw blade at the other end. The clearing saw is supported in a harness attached to the rear portion of the supporting member to hang on one side of the carrier with the driving motor behind the carrier, and is operated via handle bars on the supporting member which are fixed in front of the point of attachment of the harness. Tools for bush pruning and the like are constructed in a corresponding manner. In addition to the fact that such a tool is relatively heavy in itself (a modern clearing saw weighs about 10–12 kg), the carrier is, despite specially constructed harnesses, subjected to a considerably biased load caused by the tool hanging on one side of the carrier. Since the driving motor, which is mounted to one end of the supporting member, also is considerably heavier than the cutting tool at the opposite end, the operator must counteract non-insignificant forces of inertia when swinging the tool sideways. Such twisting loads to the back are particularly harmful and additionally prevent a quick and accurate operation of the tool which reduces the safety. Another disadvantage of this type of motor driven tools is the fact that they are normally balanced with their center of gravity located somewhat before their connection to the harness, which forces the operator to continuously lift the fore supporting member with the cutting tool, which is tiring to the arms. Naturally, such an apparatus is very trying to work .with and reduces the working capacity. Through the uneven load or bias the risk of industrial injuries is also high on a long view. There is therefore a need of a back-portable motor assembly for clearing saws and the like which puts a reduced load on the body and thereby will be easier to operate. Attempts have been made to achieve this, on one hand, by reducing the weight of the tool and primarily the weight of the driving motor itself which is heaviest part, and, on the other hand, by redistributing and balancing the tool load between the arms and the back in various ways. So far, however, no satisfactory, practicable construction has been produced. This would mainly be due to the necessary power output setting a lower limit to the weight of the driving motor. A result of the efforts to reduce the motor weight has been that the cooling fan system of the motor has become undersized for operation in intense heat.

The object of the present invention is to provide a motor assembly carried on the back which, despite having a driving motor, preferably an internal combustion engine, of at least the same power as the hitherto used motors, puts a substantially reduced weight load on the carrier and does not subject the latter to any bias. Applied to, for example, an equipment for a clearing saw or the like the motor assembly of the invention provides an easily operable and safe tool which also lacks the other disadvantages of the known and hitherto used sawing equipments.

The invention is based upon the concept that a part of the motor assembly power is utilized for "lifting itself", thereby reducing the weight to be carried. This is accomplished by making the motor assembly, simultaneously with driving the desired implement or tool, drive at least one propeller means in the form of a propeller, an impeller or the like, to provide a lifting force counteracting the weight of the assembly and sufficient to balance the latter at least to a major part. Although it may in many cases be a more complicated and more expensive alternative, it is within the scope of the invention to use two separate driving motors in the motor assembly, viz. one (usually smaller) motor to provide the lifting force and one (usually bigger) motor for driving the tool. Since the air flow from the propeller means may be utilized for cooling the motor, no special cooling fan for the motor (or motors) wil be needed. Usually the cooling obtained hereby will also be considerably better than that of a conventional cooling fan. Due to this arrangement with lifting force producing propeller means driven by the motor assembly, a back-portable motor assembly will thus be provided which puts a substantially reduced weight load on the carrier. While the fuel consumption will be somewhat higher, it will be outweighed by the increase of the operator's working capacity and comfort that is achieved. In the bargain one also obtains, as mentioned above, an excellent cooling capacity providing an efficient cooling of the motor even in operation at high temperatures.

The propeller means may be arranged in various ways to provide the desired lifting force. Preferably, the propeller means are positioned in the upper or lower part of the motor assembly. In the former case, which may be preferable, the air flow generated by the propeller means will cool the motor, while in the latter case the intake air to the propeller means may be utilized for the cooling.

Although the lifting force may be adjusted such that the motor assembly will be substantially weightless in its operative condition, it is for certain reasons convenient to let the assembly, even at maximum speed of the motor, load the operator with a certain weight, e.g. 2–4 kg, as will be described in more detail further below. Depending on the load on the working tool, e.g. a clearing saw tool, coupled to the motor assembly, the motor speed will (provided that the same motor is used for driving the propeller means and the tool) vary to some extent, which in turn means that the weight of the assembly which is experienced by the operator will also vary a little. Such a variation would well be tolerated by the carrier, but according to a preferred embodiment of the invention means are arranged for maintaining the lifting force substantially constant. This may, for example, be achieved by controlling the intake flow to the propeller means, e.g. by having the intake flow pass through an opening with a controllable intake area. Alternatively, the motor seed may be kept constant, e.g. by electronic control of the fuel flow to the engine. Preferably means are also provided for controlling the lifting force, such that a suitable individual adjustment may be made by the operator.

The propeller means may be designed in various ways in accordance with per se known technology.

While the inventive concept may be realized with one single impeller in the form of a propeller or a fan wheel, preferably two, or possibly more, such impellers will be used in combination. Two impellers mounted to the same drive shaft with intermediate guide vanes give a substantially twofold increase of the lifting force in comparison with the use of one single impeller. Corespondingly three impellers will give a threefold increase of the lifting force. Instead of mounting two impellers on the same drive shaft they may be arranged to rotate at the same speed but in opposite directions through driving by separate drive shafts, whereby the need of guide vanes is eliminated. The more detailed design of fan wheels, propellers, guide vanes etc. to achieve the desired lifting force may be made in accordance with known technology in aircraft and fan engineering and will not be further discussed herein.

In the preferred embodiment wherein one and the same internal combustion engine drives both the propeller means and the tool, etc. to be powered by the engine, the power transmission between the engine and the propeller means may be arranged in various ways. Thus, it may be completely mechanical by connection of the propeller means drive shaft or shafts to the engine output shaft through gear transmissions, driving belts or the like. Alternatively, hydraulics or pneumatics may be utilized, optionally in combination, so that a hydraulic motor or a pneumatic motor will drive the propeller means. In such a case also the desired tool driving is suitably effected by a hydraulic or pneumatic motor. Also electric driving of the propeller means, as well as of the connected tool, may be contemplated, in which case the internal combustion engine will drive a generator providing the necessary current to electric motors arranged to drive the propeller means and tool, respectively. While the use of hydraulic, pneumatic and/or electric driving would make the motor assembly heavier and more lumbering, a greater flexibility in the utilization of the assembly for various purposes is achieved. The weight increase may, of course, be compensated by increasing the lifting force of the propeller means (and thereby also the power consumption).

While the inventive principle could per se be applied to a conventional clearing saw equipment of the initially described kind, the invention is most advantageously utilized if the "weight relieved" motor assembly is carried in a harness which, similarly to the harness of, for example, a rucksack, loads the operator's back and shoulders equally on both sides. Depending on the intended use of the motor assembly it may be mounted rigidly to the harness or to be laterally pivotal therein, in both cases via vibration damping members. According to a preferred embodiment of such a devibrated suspension in the harness the motor assembly is connected to the harness through one single suspension point, which is devibrated both vertically and horizontally. A pivotal vibration-damped suspension point may be accomplished by means of a vertically, conically tapering joint portion extending from the actual motor assembly and which is pivotally received in a sleeve corresponding to the cone-shaped portion, the outside of which sleeve is connected to a surrounding holder via a layer of a vibration damping material, said holder being fixed to the harness in any suitable manner.

As mentioned above the transmission of the motor assembly power for driving various tools or implements may be effected either purely mechanically or in a hydraulic, pneumatic or electric way, or possibly with combinations thereof. In the case of a purely mechanical power transmission the motor assembly is provided with at least one output drive shaft, to which the desired implement or tool may be connected. When utilizing the invention for, for example, a clearing saw or similar shear or cutting tools the power transmission may be effected by means of a power transmission shaft or tube, which is pivotally mounted to the motor assembly to permit upward and downward swinging thereof. Since the motor assembly can be turned to the sides in the harness an excellent mobility of the power transmission tube will thus be obtained. In such a case a drive shaft is rotatably journalled in the power transmission tube in conventional manner, and a pivotal coupling thereof to the output drive shaft from the motor assembly may be accomplished by a suitable bevel gear or the like. In a preferred embodiment of the motor assembly of the invention combined with such pivotally mounted power transmission tube the latter is spring biased to the motor assembly to be held up in a suitable position by the spring means. The operator does therefore not have to continuously support the power transmission tube with the connected tool with his arms but instead, when necessary, presses the power transmission tube downwards (and, of course, also upwards) against the spring force. The biasing force is preferably adjustable to permit a balancing depending on the connected tool and the desired operating position. In a further preferred embodiment the power transmission tube is telescopically arranged so that it may be continuously extended or compressed as necessary.

In case of a hydraulic, pneumatic or electric power transmission no such power transmission tube will usually be necessary, but the working tool will form a separate unit together with a small hydraulic motor, pneumatic motor or electric motor in connection with the tool, the power transmission being effected through hydraulic or pneumatic tubes or an electric lead.

The weight-relieved motor assembly of the invention for carrying on the back may find use in many fields. Thus, it may be used in forestry for various sawing equipments, e.g. for clearing sawing and thinning of young forests; cutting and shearing equipment for cutting grass and underwood; as well as for spraying assemblies. For the latter use a relatively greater power would be required to balance the, at least at the beginning of the spraying process, substantial weight of the spray liquid. In gardening the motor assembly of the invention may be used for driving tools for cultivation, hedge cutting, spraying, etc. Furthermore, it may be used in building sites for driving portable tools for, for example, vibrating concrete castings. The above enumeration is, of course, only an example of different uses of the invention, and many other applications are possible.

Figure 2:
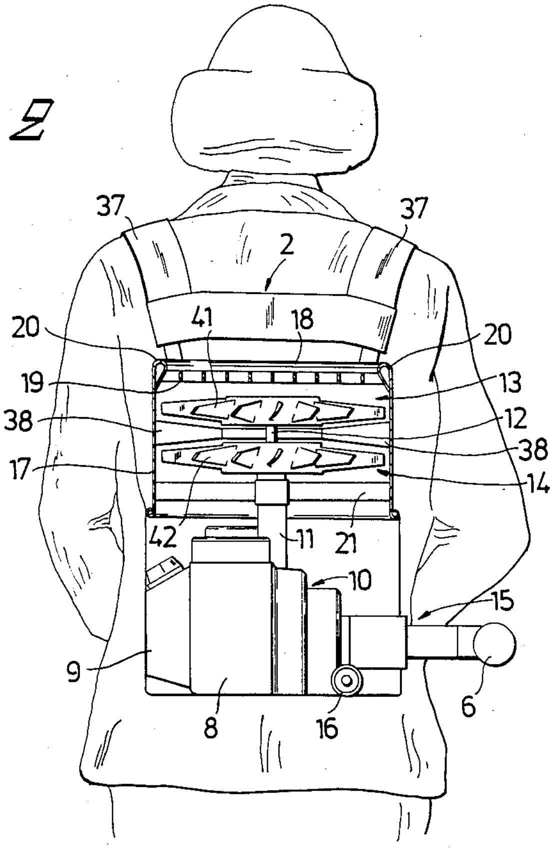
Figure 3:
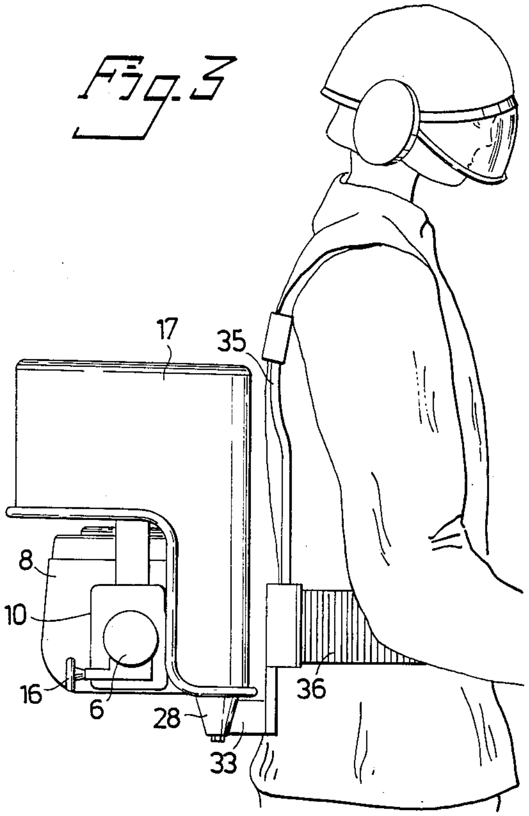
Figure 6:
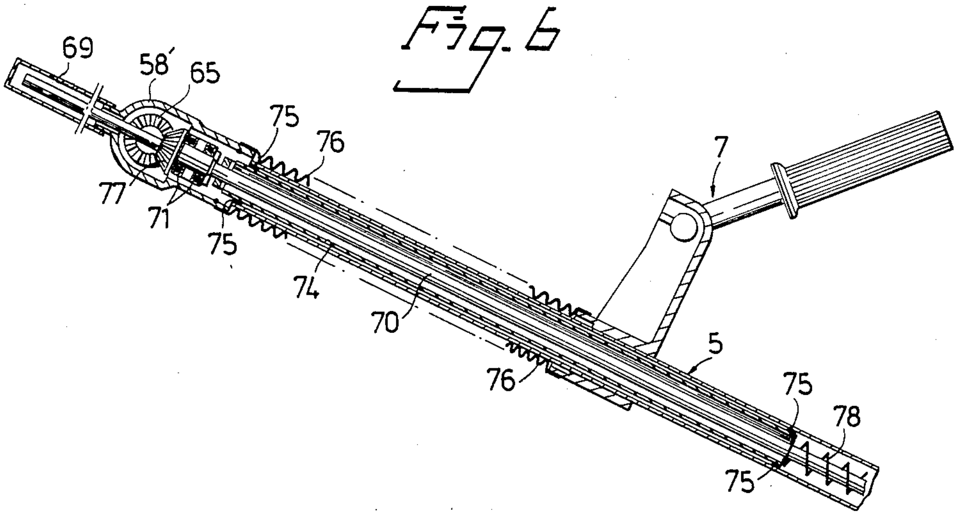
Figure 5:
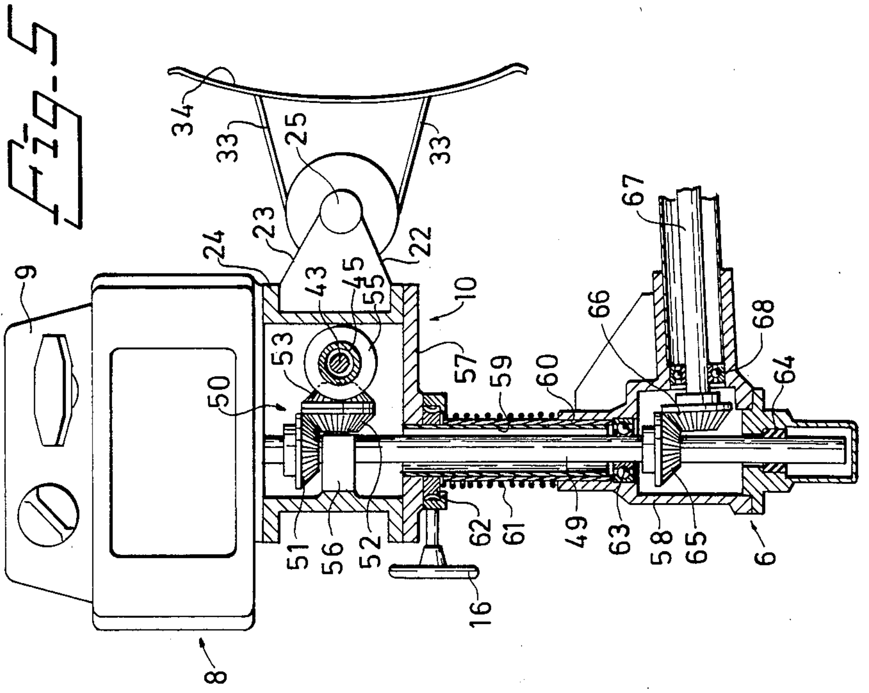
Figure 4:
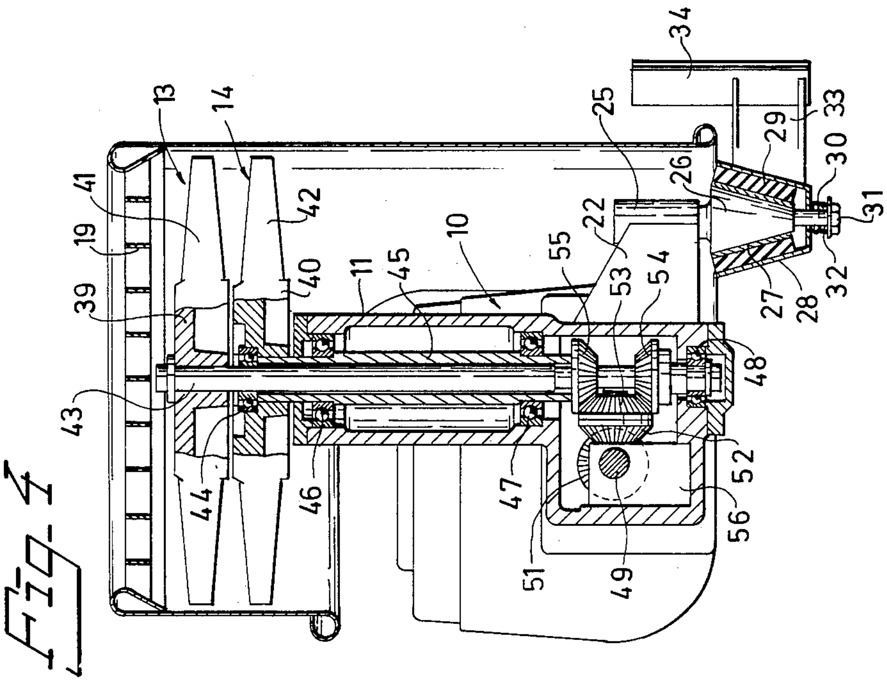
Figure 7:
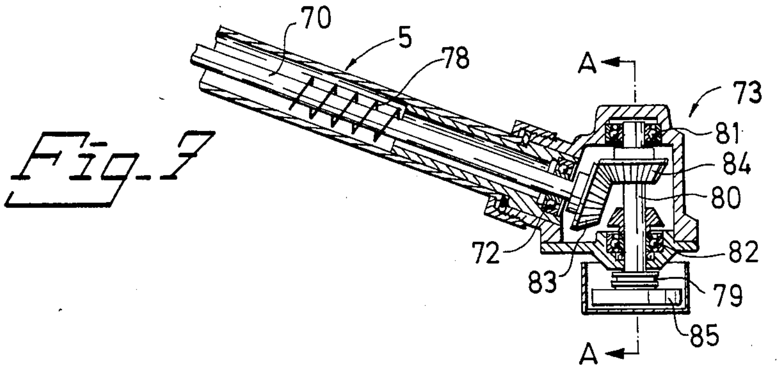
Figure 8:
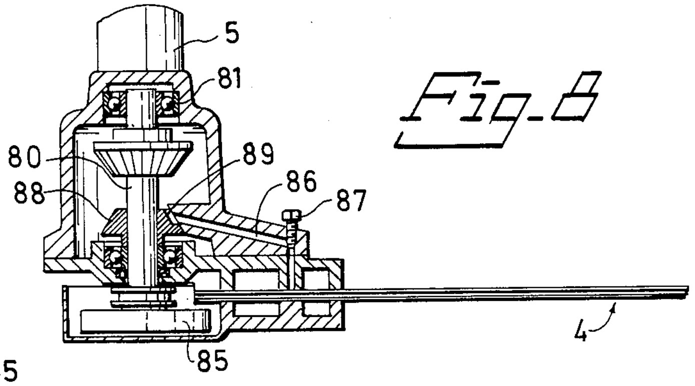
Figure 9:
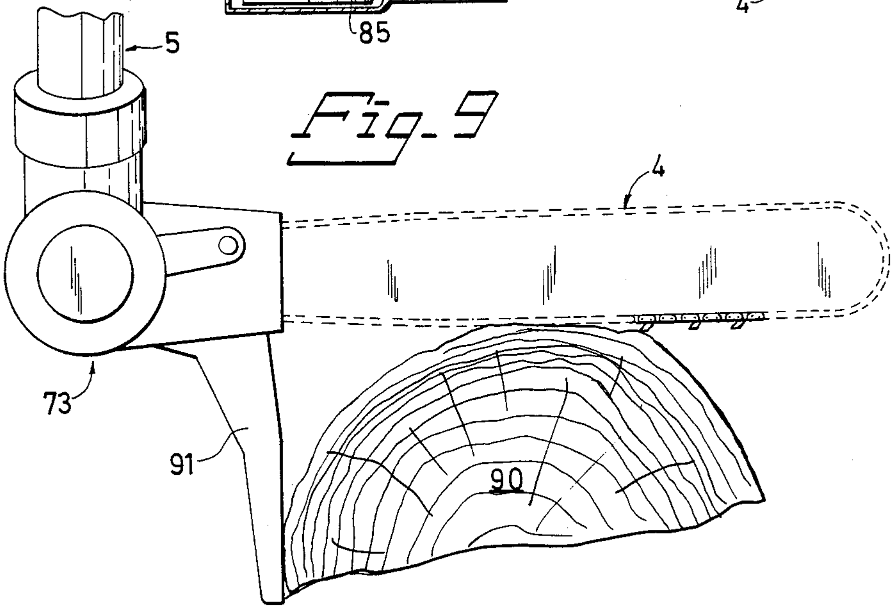

In the following the invention will be illustrated in more detail with reference to a particular embodiment in connection with the accompaning drawings, wherein FIG. 1 schematically illustrates the use of an embodiment of the motor assembly of the invention in the form of a sawing equipment for clearing and thinning young forests, FIG. 2 is a schematic rear view, with parts broken away, of an embodiment of the proper motor assembly of FIG. 1 supported by an operator, FIG. 3 is a schematic side elevation of the supported motor assembly of FIG. 2, FIG. 4 is a schematic side elevation, partially in section and having parts broken away, of a modified embodiment of the motor assembly of FIG. 2 and 3, FIG. 5 is a horizontal view, partially in section, of the driving and power transmission part of the motor assembly of FIG. 4, FIG. 6 is a sectional view of the rear part of an embodiment of the power transmission tube of FIG. 1, FIG. 7 is a sectional view of the fore part of the power transmission tube of FIG. 6, FIG. 8 is a sectional view along A—A in FIG. 7, and FIG. 9 is a schematic plan view of a chain saw cutting bar mounted to the power transmission tube.

The clearing saw equipment of FIG. 1 comprises a motor unit 1 carried in a harness 2 by an operator 3. The motor unit 1 drives a cutting bar 4 attached to one end of a power transmission or drive shaft tube 5, which is operatively connected to the motor unit 1 through a cardan joint 6 to be vertically pivotal and rotatable about its longitudinal axis. The motor unit 1 is movably suspended in the harness 2, so that it may be turned sideways about a vertical axis, as will be further described below. The operator 3 operates the sawing equipment via a handle or handle bars 7 fixed to the drive shaft tube 5.

The more detailed construction of the motor unit 1 and the suspension thereof in the harness 2 appears from FIG. 2–5. The power source of the motor unit 1 is an internal combustion engine 8 having a fuel tank 9. The engine 8 may be of the type usually used in chain and clearing saws with a power of, for example, 4–6 horse power and will not be further described herein. A propeller gear housing 10 is mounted on the side of the engine output drive shaft. From the upper part 11 of said gear housing a vertical drive shaft 12 protrudes which is coupled to the propeller means 13 and 14 designed to act upon the motor assembly with an upward lifting force or thrust and simultaneously cool the engine 8 with a downward airflow. Via the gear box 10 the output drive shaft of the engine 8 is coupled to the cardan joint 6 for driving the cutting bar 4 through a power transmission shaft rotatably journalled in the drive shaft tube 5. The cardan joint 6 is vertically pivotally connected to the gear housing 10 via a spring biased balancing joint 15, the spring force of which may be controlled by a control knob 16. The propeller section of the motor assembly is enclosed by a casing 17, the rear part of which extends downwards over the engine 8 and the gear housing 10 (FIG. 3). The intake air to the propeller means 13, 14 is admitted through an opening 18 in the casing top which is covered by a grating 19 attached to a stiffened portion 20 of the casing. The casing 17, which, for example, may be of aluminum, is in the illustrated case fixed to the upper part 11 of the gear housing 10 via cross bars 21 and, optionally, not illustrated bars connecting the lower part of the casing to a suitable portion of the engine 8 and/or the gear housing 10 or the means for suspending the motor assembly in the harness 2.

The suspension in the harness 2 appears from FIG. 2–5. Two brackets 22, 23 are in the rear part thereof attached to the base portion 24 of the gear housing 10 and in the fore part thereof to a vertical journal member 25 having a lower cone-shaped part 26. Said cone-shaped part is mounted to be rotatable about its vertical axis in a bearing sleeve 27, which preferably is of a selflubricating type. The bearing sleeve 27 is in turn fixed to a holder cup 28 via a layer 29 of a vibration damping material, e.g., such rubber materials as are usually used for vibration damping. The cone-shaped portion 26 is extended with a thin cylindric portion 30 extending through an opening in the lower part of the holder cup 28. A nut 31 on a threaded end portion of the projecting cylinder pin 30 retains a helical spring 32 between the nut and the bottom of the holder cup. With the nut 31 the bias of the spring 32 can be adjusted to a suitable contact pressure between the cone-shaped journal 26 and the bearing sleeve 27. The holder cup 28 is in turn attached by means of mounting brackets 33 to a plate 34 to be fastened to the harness 2. The harness 2 may, as shown in the Figures, consist of a rigid supporting frame 35 for bearing against the back and to which the mounting plate 34 is fixed in the lower part of the frame. The supporting frame 35 is fastened to the carrier by means of a waist belt 36 fixed to the lower part of the frame and two shoulder straps 37 fixed to the upper part of the frame. Due to the above described devibrated one point suspension substantially no vibrations are transmitted from the motor assembly to the operator since the cone-shaped design of the bearing journal and the vibration damping sleeve absorb vibrations in all directions.

In FIG. 2 the propeller means 13, 14 are intended to be mounted to the same drive shaft 12, and thereby rotate in the same direction. In this case guide vanes 38 are arranged between the two propeller means, whereby the provided fan pressure, and thereby the lifting thrust, will be doubled. In the embodiment of FIG. 4, on the other hand, which shows in more detail, an example of how the power transmission between the engine and the propeller means 13, 14 may be provided, the latter are arranged to rotate in opposite directions. The need of the guide vanes 38 is thereby eliminated since a corresponding pressure increase will still be obtained. In the illustrated case the propeller means 13, 14 consist of two fan wheels or impellers of a per se conventional type. The two impellers each comprise a central disc portion 39 and 40, respectively, and a suitable number of fan blades (e.g. six to thirty) 41 and 42, respectively, fixed to the central disc. A suitable material for the fan blades is aluminum or possibly a fibre-reinforced composite. The upper impeller 13 is fixed to a vertical drive shaft 43, which via bearing means, e.g. a ball bearing 44, is rotatably journalled within an outer drive shaft 45, to which the lower impeller 14 is fixed. The outer drive shaft 45 is in turn rotatably journalled, in relation to the upper part 11 of the gear housing 10, in upper and lower bearing means, e.g. ball bearings, 46 and 47, respectively. The lower end of the drive shaft 43 is rotatably journalled in the bottom portion of the gear housing 10 in a ball bearing 48 designed to stand a high axial load. The power transmission between the output drive shaft, designated by the reference numeral 49 (FIG. 5), of the internal combustion engine 8 and the impellers 13, 14 is effected through a gearing, generally designated by 50. The gearing 50 comprises a bevel gear 51 which is fixed to the engine shaft 49 and engages a bevel gear 52 having a rotation axis substantially perpendicular to the drive shaft 49. The gear 52 is fixed to an oppositely arranged bevel gear 53, which in turn engages, on one hand, a bevel gear 54 fixed to the inner drive shaft 43 for the upper impeller 13, and, on the other hand, a bevel gear 55 fixed to the outer drive shaft 45 for the lower impeller 14 and through which the inner drive shaft 43 extends. Through the described gear arrangement the rotation of the engine drive shaft 49 is transmitted to the two impellers 13, 14, so that they rotate at the same speed but in opposite directions. In FIG. 4 and 5 the bevel gears 51–55 are of equal size, but, of course, the size and number of teeth may be varied to give the impellers a different rate of rotation from that of the motor drive shaft.

The output drive train operator 1 includes motor drive shaft 49 rotatably journalled in a holder portion 56 in the bottom part of the gear housing and which projects through an opening in a fore, removable sidewall 57 of the gear housing. The power transmission from the drive shaft 49 to the power transmission shaft in the drive shaft tube 5 is effected by the above mentioned cardan joint or bevel gear 6. The latter is arranged in a housing 58, which is pivotally mounted in relation to the gear housing 10 (and thereby the rest of the motor assembly). To this end the gear housing 58 is connected to the gear housing 10 via two rotatably journalled cylinder sleeves 59, 60, the inner one 59 of which is fixed to the sidewall 57 of the gear housing 10 and the outer one is fixed to the gear housing 58. A helical spring 61 is mounted on the outside of the outer cylinder sleeve 60 with one end thereof fixed to a worm gear 62 and the other end fixed to the gear housing 58. The worm gear is rotatably journalled in the gear housing 10 and may be rotated by means of the previously mentioned control knob 16. The helical spring 61 is arranged such that it will maintain the gear housing 58 and the drive shaft tube 5 with the cutting bar 4 at a certain level in relation to the stationary part of the motor assembly. By rotating the control knob 16 the tension of the helical spring 61 can be adjusted to position the drive shaft tube 5 at a desired level. The more the spring is stretched, the higher moment load can the spring absorb, and the more raised will consequently the end of the drive shaft tube be according to the increased effective length of the lever. The drive shaft tube with the associated sawing unit will thereby be supported completely by the motor assembly and thus only load the operator's back. In order to restrict the moment action in the suspension point 26, 27 as far as possible the weight distribution of the motor assembly, including the drive shaft tube and cutting tool, is adapted to permit the center of gravity to coincide with the point of suspension.

In the gear housing 58 the output drive shaft 49 of the engine is rotatably journalled in a ball bearing 63 before the gearing, and a packing 64 after the gearing. The gearing consists of a bevel gear 65 which is fixed to the drive shaft 49 and engages a bevel gear 66 fixed to a power transmission shaft 67 rotatably journalled in the drive shaft tube 5 in ball bearings, one of which, 68, in the figure is mounted in the gear housing 58. The power transmission shaft 67 with its associated gear 66 is mounted substantially transversely to the engine drive shaft 49 with the gear 65. The power transmission shaft 67 in turn drives the chain saw bar 4 (FIG. 1), through a suitable bevel gear, as will be further described below.

The drive shaft tube 5 with the chain saw bar 4 is operated, as mentioned above, by means of the handle or handle bars 7, which are attached to the drive shaft tube 5 via a suitable vibration damping material, so that the vibrations of the tool will not be transmitted to hands and arms. Suitably, a throttle control is mounted to the handle bars 7 for controlling the engine speed. The engine 8 is suitably started by a starting strap (not shown), which runs in one shoulder portion of the harness and is easily accessible to the operator. When the engine 8 operates, the engine output drive shaft 49 drives the two impellers 13, 14, via the gearing 50 and the drive shafts 43, 45, as well as the chain saw bar 4, via the gearing 65, 66 and the power transmission shaft 67. When the impellers 13, 14 rotate, air is sucked in through the grating 19 and is given a speed and pressure increase by the impeller blades 41, 42 to provide a lifting force acting upwards upon the motor assembly simultaneously with an excellent cooling of the internal combustion engine 8. The lifting force, which i.a. depends on the number of impellers and the design thereof as well as the rotary speed, is adjusted such that the operator still experiences a certain weight, e.g. of the order of magnitude of 2–4 kg, since too great a lifting force which tends to lift the assembly out of the harness would be inconvenient to the operator. The more detailed choice of the number of impellers and the design thereof is within the skill a person skilled in the art and will not be further discussed herein. As an example may be mentioned that if the whole clearing saw equipment, including the motor assembly, weighs about 12 kg, a suitable lifting force at the normal operating speed of the engine, e.g. 5000 rpm, is about 8 kp. The operator will then experience the weight of the sawing equipment as about 4 kg. The necessary effect to drive the impellers 13, 14 and provide the desired lifting force, of course, also depends on the total weight of the sawing equipment and the desired maximum weight reduction as well as on how well the efficiency of the impeller arrangment has been optimized. For a 4 horsepower driving motor 8, which would be sufficient for a clearing saw of the described type, an 8 kp lifting force may be effected with a power supply of about 0,8kW.

A conventional driving motor for the described clearing saw equipment normally has an operating range between about 3000 rpm and 6000 rpm, the speed control being performed by the throttle control on the handle bars 7. Since, in the illustrated case, the lifting force will be completely dependent upon the motor speed, the operator will experience the sawing equipment as heavier the lower the speed is. Since the operator will be capable of adjusting the motor speed rather quickly with the throttle control, he can prevent too high a lifting force, which according to the above could be inconvenient, in case of a possible overspeeding of the engine. Preferably, however, means are provided which restricts the lifting force such that it cannot exceed the weight of the equipment. This may, for example, be accomplished by electronic control means, which affect the fuel flow to prevent a predetermined maximum speed from being exceeded, e.g. 6000 rpm. Alternatively, the control means may be coupled to the ignition system to switch off the ignition current when the predetermined speed is exceeded. Of course, the control means may also be arranged to continuously maintain the motor speed at a predetermined value, whereby the same lifting force will always be obtained. An alternative arrangement is to control the intake area for the intake air to the impellers to maintain the lifting force substantially constant. This may, for example, be accomplished by some form of motor speed controlled "diaphragm" or damper in the aperture 18 of the casing or cover 17. Another arrangement is to provide the central disc of the impeller with spring-actuated side plates, which are folded out by the centrifugal force to increase the area of the central disc–and thereby decrease the effective part of the impeller blades–depending on the speed of rotation(the motor speed).

When operating the above described clearing saw equipment the operator will consequently experience a very moderate part of the total equipment weight. Neither will, due to the devibrated one point suspension, any vibrations be transmitted from the motor via the harness. Further, the drive shaft tube 5 with the sawing tool 4 will, as mentioned above, be supported by the motor assembly in the desired, pre-adjustable position and can easily be moved vertically with as well as against the force of the helical spring 66. Thereby the operator will be loaded only when he needs to change the inclination of the drive shaft tube. Swinging of the drive shaft tube to the sides is effected by rotation of the whole motor assembly in the suspension joint 26–28. Finally, the sawing tool 4 may be turned by rotating the drive shaft tube 5 about its longitudinal axis. The above described clearing saw equipment is thus excellently convenient to operate and will substantially increase the operator's working capacity and comfort.

FIG. 6 and 7 show an example of a suitable design of the power transmission or drive shaft tube 5. In this embodiment the drive shaft tube is extensible, and it will be appreciated through the following description that the above described design of the gear housing 6 can not be used in this case. The end of the drive shaft 49, which in the previously described embodiment optionally also may be used as an additional power output, is excluded here, so that the drive shaft ends just after the bevel gear 65. The modified bevel gear housing, here designated by the reference numeral 58', has an extension 69 (illustrated shortened) arranged to permit accommodation of the end of a sliding drive shaft 70 (corresponding to the shaft 67 of FIG. 5), which is rotatably mounted in the drive shaft tube 5 in two ball bearings 71 in the gear housing 58' as well as in a ball bearing 72 in a lower gear housing 73 at the other end of the drive shaft tube 5. The housing 58' is attached to an inner tube cylinder 74, in which the upper part of the power transmission shaft 70 extends. The tube cylinder 74 is slidably mounted in the upper part of the drive shaft tube 5 via sliding means 75 at each end thereof. The handle bars 7, to one handle of which a not illustrated throttle control is attached, are rigidly, but preferably in a vibration damped manner, mounted to the drive shaft tube 5, and a compressible protective gaiter or bellows 76 (only hinged in the figure) is arranged over the drive shaft tube 5 between the gear housing 58' and the mounting portion of the handle bars 7 on the drive shaft tube. The power transmission shaft 70 is displaceable in its longitudinal direction in the ball bearings 7 as well as in a bevel gear 77 (corresponding to the gear 66 in FIG. 5) on the shaft. The shaft 70 is, however, not rotary in relation to the ball bearings 71 and the gear 77, which is accomplished through suitable guide means. The bevel gear 77 is driven in the same way as above by the gear 65 on the motor drive shaft 49 (FIG. 5). A draw spring 78 acting within the drive shaft tube between the end of the inner tube sleeve 74 and the lower gear housing 73 tends to maintain the drive shaft tube 5 completely drawn over the inner tube cylinder 74, such that the end thereof contacts the gear housing 58'. By bringing the handle bars forwards the operator may displace the outer tube of the drive shaft tube on the inner tube cylinder against the force of the draw spring 78 to extend the drive shaft tube. This may be valuable, for example, for sawing work where there are obstructing branches. A suitable possible extension of the drive shaft tube may be, e.g., 2–3 dm. When the drive shaft tube is extended the power transmission shaft 70 slides in the bal bearings 71 and the gear 77 as above.

The chain saw bar 4 is attached to the gear housing 73. An endless saw chain (not shown) is movable around the chain saw bar in conventional manner and runs over a pulley 79 on a drive shaft 80 at a portion thereof protruding from the gear housing 73, in which it is rotatably journalled in two ball bearings 81, 82. The power transmission from the drive shaft 70 in the drive shaft tube 5 is effected via a bevel gearing consisting of a bevel gear 83 fixed to the end of the drive shaft 70 and in engagement with a bevel gear 84 fixed to the saw drive shaft 80. The pulley 79 is attached to the drive shaft 80 via a conventional safety clutch 85, based upon centrifugal action, so that the driving of the saw chain will rapidly be disengaged if the chain gets stuck. These disengagement means may optionally be placed at another sit along the driving means, e.g. in the upper gear housing or the cardan housing 58.

Lubrication of the saw chain is effected with oil from a container (not illustrated) in the lower part of the drive shaft tube 5 adjacent to the gear housing 74. Through suitable ducts the interior of the gear housing 73 is kept filled with oil from this container. An oil duct 86 (FIG. 8) connects the inside of the gear housing with a port which opens into the interior of the chain saw bar and therefrom, in conventional manner, leads out to the guide channel for the saw chain. An adjusting needle 87 is provided for controlling the oil quantity. The oil in the gear housing 73 is metered to the oil channel 86 via a cone-shaped pulley 88 fixed to the saw driving shaft 80. The metering pulley 88 is on part of its envelope surface provided with a recess 89, which during a part of each revolution connects the channel 86 with the interior of the gear housing 73.

FIG. 9 schematically shows the bar end of the clearing tool brought against a tree 90. The reference numeral 91 signifies a support to counteract the action of the chain saw force upon the clearing saw. A transversely mounted saw bar similar to the one illustrated would definitely be the most advantageous for clearing operations. Optionally the direction of the saw bar could be made adjustable to permit a desired positioning between a transverse position, as illustrated, and a position with the saw bar arranged in the longitudinal direction of the drive shaft tube. The latter position would permit use in pruning operations. Suitably the saw bar is made sufficiently long for the clearing saw also to be used for thinning young forests. It is, of course, also within the scope of the invention to dimension the saw bar such that the sawing equipment may be used for conventional timer cutting and replace the usual hand-carried chain saws.

The devibrated one point suspension as described above, as well as the spring balanced pivotal suspension of the drive shaft tube to the motor assembly, are, of course, also advantageous in a conventional motor assembly without lifting force producing devices, and the invention therefore also comprises these devices as such.

While the use of a chain saw bar is preferred in a clearing saw equipment, a circular saw blade could just as well be used. It is to be understood that various other modifications and changes may be made in the embodiment described above nd illustrated in the drawings without deviating from the scope of the invention.

As stated above the motor assembly according to the invention is, of course, not restricted to the use in sawing and cutting equipments, but may also just as well be utilized in units for cutting grass and underwood, hedge cutting, cultivation, vibration of concrete castings, in spary units, etc. Optionally the motor assembly may be provided with some type of quick-coupling for simple connection of various implements, such as a drive shaft tube provided with a tool (similar to the one described above) or for the connection of a flexible drive shaft, for example, in hedge shears. As previously mentioned the power transmission may also be effected via hydraulic, pneumatic or electric means, optionally in combination. Other applications and modifictions are, of course, also within the scope of the inventive principle, as it is stated in the subsequent claims.

I claim:

1. A portable motor driven tool comprising, in combination, a motor assembly including a motor and means for attaching same to a human carrier for transporting the motor;

a tool means drivingly connected to the motor for actuation thereof and manipulable under the control of the carrier to convert the motor energy to useful work, e.g., cutting;

a movable aerodynamic lift force producing means separate from the tool means, said lift force producing means connected to the motor and actuatable by the motor simultaneously with the tool means, said lift producing means being arranged to generate sufficient maximum lifting thrust during operation of the motor to counterbalance at least in part the weight of the motor but insufficient maximum lifting thrust to levitate the motor and human carrier.

2. A portable motor driven tool as claimed in claim 1, said lift producing means comprising rotary propeller means.

3. A portable motor driven tool as claimed in claim 2, said rotary propeller means comprising a pair of coaxial counterrotating propellers.

4. A portable motor driven tool as claimed in claim 2, said rotary propeller means comprising a pair of coaxial corotating propellers, and including air stream flow guide vanes between the propellers.

5. A portable motor driven tool as claimed in claim 4, including concentric drive shafts connecting the propellers to an output shaft of the motor, and a transmission means in the motor output shaft drive train.

6. A portable motor driven tool as claimed in any one of claim 2, 3, 4, or 5, including control means arranged to maintain the lifting force produced by the aerodynamic lifting force producing means at a preselected constant value.

7. A portable motor driven tool as claimed in claim 6, said control means arranged to control the speed of the motor at a preselected sped to maintain the lifting force constant.

8. A portable motor driven tool as claimed in claim 1, said means for attaching the motor to a carrier comprising a harness, and said motor is suspended in the harness through a single vibration damped connection.

9. A portable motor driven tool as claimed in claim 8, said vibration damped connection point comprising a pivotal joint having a vertical axis of rotation, said joint comprising a cone-shaped journal member pivotally journaled in a corresponding cone-shaped sleeve, which, via at least one layer of a vibration damping material, is supported by a holder rigidly connected to the harness.

10. A portable motor driven tool as claimed in claim 9, wherein said tool means is connected to the motor assembly by a power transmission shaft, and wherein the center of gravity of the motor assembly including the power transmission shaft and the connected tool means is substantially located at said vibration damped connection with the harness.

11. A portable power driven tool as claimed in claim 1, wherein said tool means is connected to the motor assembly via a power transmission shaft that is vertically pivotally supported by the motor assembly, and adjustable spring means arranged to act between the motor assembly and the shaft such that the tool end of the shaft is supported to a level controlled by the spring force but which may be swung with and against the spring force.

12. A portable power driven tool as claimed in any one of claims 2, 3, 4, 5, 8, 10 or 11 wherein the tool comprises sawing equipment.

13. A portable power driven tool as claimed in claim 1, wherein said motor is air cooled and wherein said lift producing means supplies a flow of cooling air to the motor.

* * * * *